H. T. QUANDAHL.
RIBBON AND CLOTH MEASURING DEVICE.
APPLICATION FILED JUNE 23, 1909.
953,800.
Patented Apr. 5, 1910.
2 SHEETS—SHEET 1.
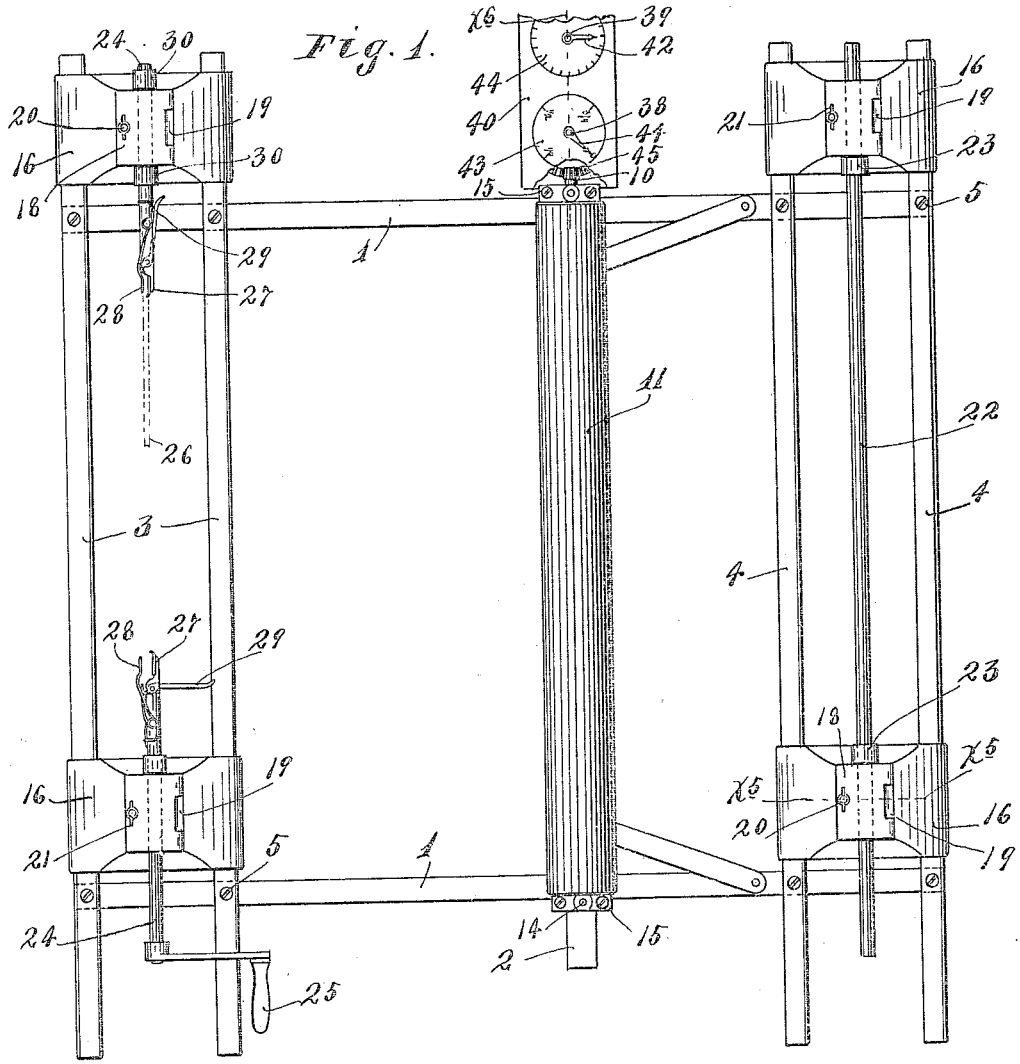
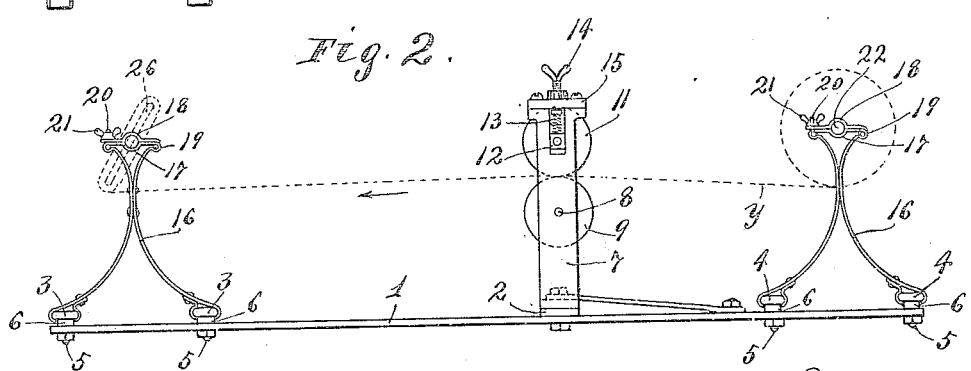
Witnesses.
A. H. Opsahl.
W. H. Souba.
Inventor
Hans T Quandahl
By his Attorneys.
Williamson Merchant H. T. QUANDAHL.
RIBBON AND CLOTH MEASURING DEVICE.
APPLICATION FILED JUNE 23, 1909.
953,800.
Patented Apr. 5, 1910.
2 SHEETS—SHEET 2.
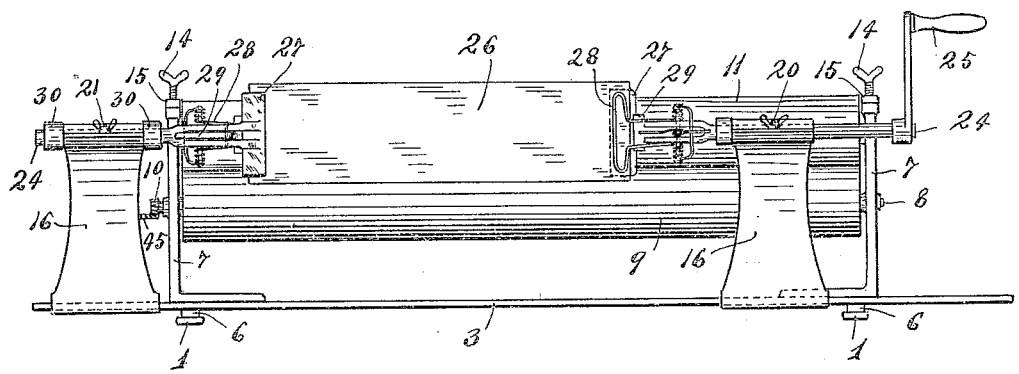
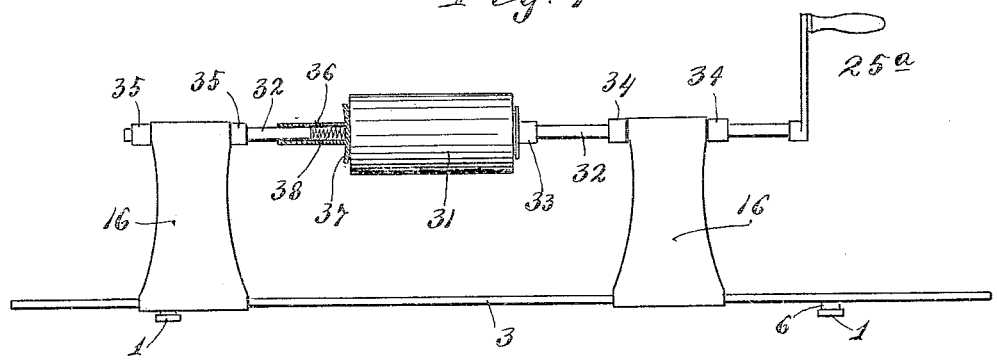
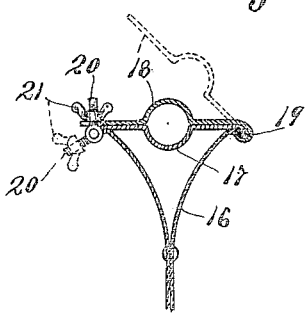
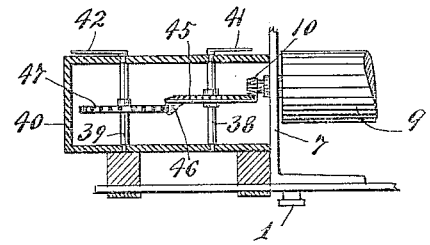

UNITED STATES PATENT OFFICE.

HANS T. QUANDAHL, OF NORTHWOOD, IOWA.

RIBBON AND CLOTH MEASURING DEVICE.

953,800. Specification of Letters Patent. Patented Apr. 5, 1910.

Application filed June 23, 1909. Serial No. 503,826.

*To all whom it may concern:*

Be it known that I, HANS T. QUANDAHL, a citizen of the United States, residing at Northwood, in the county of Worth and State of Iowa, have invented certain new and useful Improvements in Ribbon and Cloth Measuring Devices; and I do hereby declare the following to be a full, clear, and exact description of the invention, such as will enable others skilled in the art to which it appertains to make and use the same.

My invention has for its object to provide an improved lineal measuring machine, especially adapted for use in measuring ribbon or cloth, and to this end, the invention consists of the novel devices and combinations of devices hereinafter defined and described in the claims.

In the accompanying drawings, which illustrate the invention, like characters indicate like parts throughout the several views.

Referring to the drawings: Figure 1 is a plan view of the improved device; Fig. 2 is a side elevation of the same; Fig. 3 is a front elevation of the measuring device; Fig. 4 is a front elevation showing a modified form of the ribbon or cloth winding shaft; Fig. 5 is a detail in section on the line $x^5$ $x^5$ of Fig. 1; and Fig. 6 is a detail in section on the line $x^6$ $x^6$ of Fig. 1.

The base frame of the device is made up of a pair of longitudinally extended bottom bars 1, that are rigidly tied together by a central transverse bar 2, and front and rear pairs of guide rails 3 and 4 respectively, which rails, are, as shown, rigidly secured to the said bars 1 by screws 5, and are spaced apart from said bars by narrow blocks 6, which latter leave the edges of said rails free and projecting beyond the same. Rigidly secured to each bar 1, and to the end of the tie bar 2, is a pair of bearing pedestals 7 in the intermediate portions of which the projecting shaft 8 of a measuring roller 9 is journaled. The roller shaft 9, at one end, is provided with a small bevel pinion 10, which serves to drive an indicator, as will presently appear.

Overlying and coöperating with the measuring roller 9, is a pressure roller 11, the shaft of which is journaled in bearing blocks 12, mounted to slide vertically in the upper end portions of the pedestals 7. The bearing blocks 12 are intermediately pressed downward by coiled springs 13, which in turn, are subject to adjusting screws 14 arranged to work through caps 15 secured to the tops of the said pedestals 7.

On each pair of rails 3—4, is mounted to slide, a pair of bearing brackets 16. As shown, these bearing brackets 16 are formed with curved legs, having at their lower ends, reversely bent claws that engage and slide upon the edges of the said rails. The upper portions of the brackets 16 are approximately horizontal, but have central depressions that afford half seats 17 for shafts which are detachably mounted therein. To detachably hold the shafts in the said half seats 17, clamping plates 18 are hinged to said brackets 16 at 19, and at their free edges, are provided with notches adapted to be engaged by short clamping bolts 20, that are also pivoted to the said brackets, and are provided with thumb nuts 21. The said clamping plates 18 are also intermediately bent to form half seats for coöperation with the said half seats 17. The seats 17 are adapted to receive various different kinds of shafts. Uusually the ribbon or cloth marked $y$, and indicated by dotted lines in Fig. 2, will be in the form of a round bolt, and when this is the case, a spindle or shaft 22 may be inserted through the axis of the bolt and then applied in the seats 17 of the two rear brackets 16. In case the cloth or lace is wound upon a flat board the shaft 22 will be passed through the bolt of cloth or lace next to the board about which it is wound, in which case suitable means, not shown, will be provided for securing the board to the shaft. As shown in Fig. 1, the spindle 22 is provided with collars 23 that engage the upper end portions of the brackets 16, and hold the said spindle against endwise movements. The bearing brackets 16 are, of course, capable of adjustment when engaged with a shaft or spindle of any desired length.

In each of the front bearing brackets, 16, a short winding shaft 24 is mounted, and one of these shafts is provided with an operating crank 25. In handling ribbon, the section which is unwound from the bolt, and is to be sold, will usually be wound upon a flat strip of paste board 26, and for the purpose of conveniently attaching this strip 26 to the shafts 24, the latter are preferably provided at their inner ends with clamping jaws 27 and 28, adapted to be opened and closed by small pivoted levers 29. These shafts 24 are detachably held in the seats 17 by the clamping plates 18. The shaft 24 having the crank 25, is preferably mounted for endwise, as well as rotative movements in the bearing bracket 16, in which it is applied; while the other shaft 24 is preferably provided with stop collars 30 that hold the same against endwise movements, while permitting free rotation thereof. The bearing brackets 16 are, as is evident, capable of being slid on the rails 3 and 4, so as to set the machine for handling material of various widths.

It is sometimes desirable to wind ribbon or cloth upon a roller or paste board cylinder, such as shown at 31 in Fig. 4, and for this purpose, as substitutes for the shafts 24 above described, axially alined shafts 32 are provided. One of these shafts is provided with an operating crank 25$^a$ at its outer end, and at its inner end, with a roller clamping head 33. At its intermediate portion, this crank-equipped shaft 32 is provided with stop collars 34, that engage the upper end of the bearing bracket 16 to which it is applied, and hold the said shaft against endwise movements. The other shaft 32 is provided with stop collars 35 that engage the upper end of the bracket 16 to which it is applied and hold the same against endwise movements. At its inner end, this last noted shaft 32 is provided with a telescopically movable sleeve 36, having a clamping head 37, which, by a light coiled spring 38, is adapted to be frictionally pressed against the adjacent end of the roller or cylinder 31. In this way, the said cylinder or roller 31 will be held for rotation with the axially alined shaft 32. If desired, one or both of the clamping heads 33—37 may be provided with projecting barbs or pins adapted to be forced into the ends of the said drum.

The ribbon or cloth to be measured, is, of course, passed between the rollers 9 and 11, as indicated by dotted lines in Fig. 2. The roller 9 drives an indicator which registers the length of material unwound from the bolt. This indicator may take various forms, but preferably involves two shafts 38 and 39, mounted in a box 40, and provided with pointers 41 and 42 that coöperate respectively with dials 43 and 44 on the top of the said box 40. The dial 43 is preferably arranged to register fractions of a yard while the dial 44 is arranged to register the number of yards. The shaft 38 within the box 40, has a bevel gear 45, that normally meshes with the bevel pinion 10 on the shaft of the measuring roller 9. The bevel gear 45 carries a single lug 46, and is adapted to engage once for each rotation of the shaft 38 with a tooth of a large gear 47 of the shaft 39. To detachably secure the box or register case 40 in working position, it is provided in its bottom with a longitudinally extended seat that is normally telescoped onto the projecting end of the intermediate tie bar 2. When the said box is placed in working position, the gear 45 is put in mesh with the pinion 10, but when the said box is drawn outward, the said gear and pinion are separate.

The device above described, while of extremely simple construction and of small cost, is, nevertheless, sufficient for the purposes had in view, and is capable of quite a large range of work.

The shafts 22, 24 and 32 may be interchanged, that is, any one thereof may be applied either in the front or in the rear bearing bracket 16, and in this connection it should be noted that the indicator will run in either direction. In some instances, the grapple jaws 27—28 and the clamping heads 33 and 37 will be detachably applied and interchangeably usable on the shaft sections 24. In some cases, it may be desirable to use the shafts 22, 24 and 32 in pairs, in which case one thereof may be applied to the front of the machine and the other to the rear of the machine.

What I claim is:

1. In a device of the kind described, the combination with a frame, including front and rear pairs of guide rails, of spacing blocks of less width than said rails interposed between said frame and said rails, a pair of measuring rollers mounted on said frame between said pairs of guide rails, bearing brackets having rail-engaging feet slidably mounted on said guide rails and adapted to pass said spacing blocks, half seats and coöperating clamping plates on said bearing brackets, means for securing said clamping plates in working position, a spindle adapted to hold a bolt of cloth and to be applied in the half seats, of one pair of said bearing brackets, and axially alined shafts rotatively mounted in the other two bearing brackets, one of said shafts having an operating crank and both of said shafts, at their inner ends, having clamping means for engaging and holding a form upon which the measured material is to be wound, substantially as described.

2. In a device of the kind described, the combination with a rectangular base frame and front and rear shaft bearings thereon, said frame having an intermediate tie bar, one end of which projects at one side of said frame, a pair of coöperating measuring rollers mounted on said frame above said tie bar, and an indicator having a frame or case provided with a seat adapted to be detachably secured to the projecting end of said tie bar by a sliding endwise movement, one of said measuring rollers having a pinion and the said indicator having a gear normally engaged therewith, substantially as described.

In testimony whereof I affix my signature in presence of two witnesses.

HANS T. QUANDAHL.

Witnesses:
L. O. BROWN,
R. WILSON.